Sept. 10, 1963  R. S. BORGHESANI  3,103,151
CAMERA MECHANISM

Filed Oct. 3, 1960  4 Sheets-Sheet 1

INVENTOR.
Robert S. Borghesani
BY Brown and Mikulka
and
Robert J. Schiller
ATTORNEYS Sept. 10, 1963 R. S. BORGHESANI 3,103,151
CAMERA MECHANISM
Filed Oct. 3, 1960 4 Sheets-Sheet 2

INVENTOR.
Robert S. Borghesani
BY Brown and McKulka
and Robert J. Schiller
ATTORNEYS Sept. 10, 1963 R. S. BORGHESANI 3,103,151
CAMERA MECHANISM
Filed Oct. 3, 1960 4 Sheets-Sheet 3

INVENTOR.
Robert S. Borghesani
BY Brown and Mikulka
and
Robert J. Schiller
ATTORNEYS Sept. 10, 1963 R. S. BORGHESANI 3,103,151
CAMERA MECHANISM
Filed Oct. 3, 1960 4 Sheets-Sheet 4

INVENTOR.
Robert S. Borghesani
BY Brown and Mikulka
and
Robert J. Schiller
ATTORNEYS United States Patent Office 3,103,151
Patented Sept. 10, 1963

3,103,151
CAMERA MECHANISM
Robert S. Borghesani, Arlington, Mass., assignor to Polaroid Corporation, Cambridge, Mass., a corporation of Delaware
Filed Oct. 3, 1960, Ser. No. 60,037
7 Claims. (Cl. 95—40)

This invention relates to photographic apparatus, and more particularly to a lens-board extending and focusing device for cameras.

A principal object of the present invention is to provide a novel means for extending and withdrawing lens and shutter elements of a folding type camera.

Other objects are to provide a manually operable system for both extending the lens and shutter elements of a camera as well as focusing said camera by adjustably positioning said elements; to provide an extending and focusing system of the type described wherein the rotation of a manually engageable member is translated into linear motion for moving said elements; and to provide a system of the type described which allows the construction of an extremely compact folding camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 5:
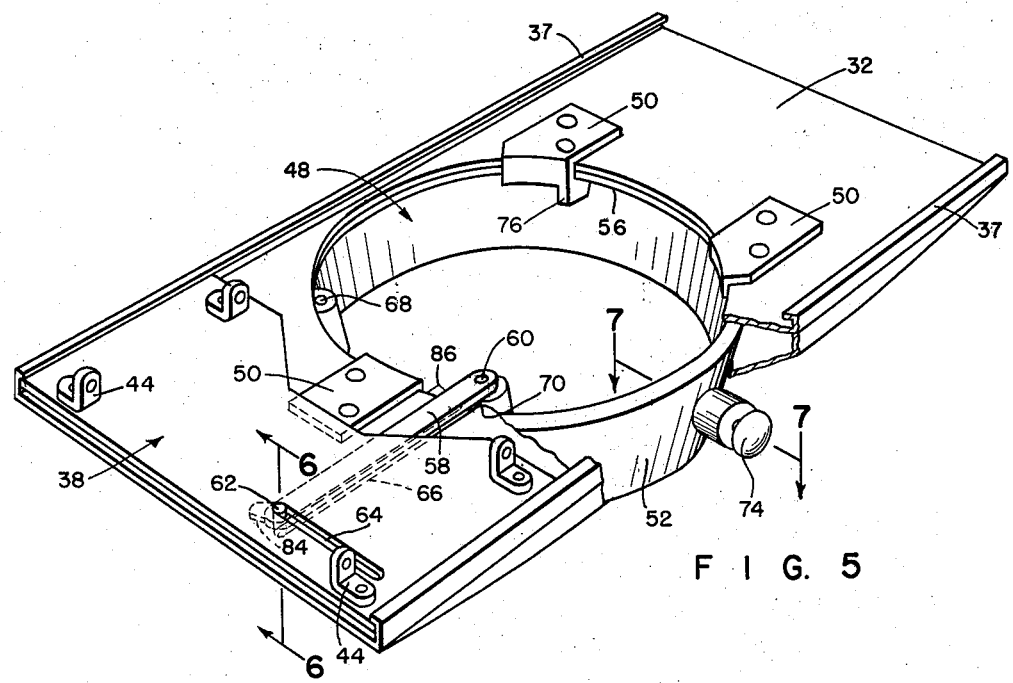
FIG. 5 is a schematic perspective view of an extending and focusing mechanism embodying the principles of the invention as incorporated into the structures shown in FIGS. 1 through 4.

FIGS. 8 through 11, inclusive, are a series of schematic views of selected elements of the embodiment of FIG. 5, showing the elements in a variety of positions.

For camera lens systems having a focal length which is comparatively long relative to the maximum lens aperture, in the interest of providing a compact device it has been desirable to provide a mechanism for moving the lens system between a position closely adjacent the exposure plane of the camera to a position at which the exposure plane and focal plane of the lens system are substantially coexistensive. To provide a covered or protected optical path between the lens system and the exposure plane, such cameras usually include an expansible and collapsible bellows. The art discloses a huge number of mechanical systems for extending and retracting a lens board relative to the camera body. For instance, there are systems in which a linkage is actuated to extend a lens board and bellows by the opening movement of a camera bed as it pivots outwardly from a camera body. Alternative arrangements have employed spring-loaded systems which automatically extend the entire lens board from the camera body, the retraction of the lens board being accomplished manually. And other systems have simply provided a track on the camera bed, the lens board and bellows being moved outwardly from the camera body by manual withdrawal.

Although cameras may be focused by movement of the lens system, per se, while the lens board remains substantially fixed relative to the exposure plane of the camera, the bellows type of camera almost invariably employs a focusing system which operates by moving the entire lens board and lens and shutter system back and forth relative to the exposure plane of the camera.

The present invention therefore contemplates a novel system for reversibly extending the elements of bellow type cameras wherein the same mechanism is employed both for moving the camera elements to and from a folded position, and for focusing the camera elements when at an extended position.

The extending and the tracking system, hereinafter called the erecting system, generally comprises a rotatable element mounted upon the camera bed and connected to a movable carrier element upon which the camera lens board is mountable. Upon manipulation of a rotatable element through a limited arc, the carrier element is moved over a distance which is substantially greater than the chord subtended by the arc. In order to move a carrier element a comparable distance by rotation of another element geared to a rack, the rack would necessarily be so long as to create a very awkward problem of fitting it to a camera bed. In the preferred embodiment the rotatable element is so constructed and arranged that when the camera is in a collapsed state (i.e., the bellows are collapsed and the camera bed is pivoted into position of closure with respect to the camera body), the rotatable element forms a protective enclosure for the lens and shutter assembly of the camera.

Referring now to the drawings wherein like numerals denote like parts, some of the elements are shown in FIGS. 1 through 4 as they would appear from a position substantially to one side of the camera. The direction of movement and the location of the elements as hereinafter described are those which would be observed when the elements are viewed from the above-described position, the descriptive language employed being in accordance with the position of observation and not in any sense a limitation otherwise. FIGS. 1 through 4 show a hand held camera of the folding type, well known in the art, and which incorporates an erecting system embodying the principles of the present invention. As a means for supporting and enclosing elements of the camera, a housing indicated at 20 is provided, the housing comprising a substantially hollow container in which photosensitive material may be disposed, and having an opening 22 on one side thereof through which elements of the camera are extendable. Operatively connected to opening 22 in the housing in a suitable means, such as lens board 24, for mounting a lens and shutter assembly shown at 26. The latter may be of any conventional design, a typical assembly being disclosed in U.S. Patent 2,662,457, issued to Murray N. Fairbank on December 15, 1953. The operative connection between the lens board and the periphery of opening 22 preferably comprises the usual extensible and collapsible means such as bellows 28.

Swingingly connected to the housing adjacent opening 22, as at pivot 30, is a supporting means such as camera bed 32. The camera bed comprises an approximately flat, rectangular element and is pivotable between a first or closed position and a second or open position wherein the bed extends outwardly and substantially normal to the exposure plane in which the photosensitive material is disposed within the housing. In this second position the bed is intended to provide support for lens board 24. In its closed position, the bed is so located with its inner surface adjacent opening 22 as to provide a partial protective covering with respect to opening 22 then enclosed within the housing. Suitable latch means such as spring latch 33 may be provided adjacent the edge (hereinafter referred to as the far edge) of the bed opposite the pivoted edge, the latch being engageable with a portion of the housing to releasably retain the bed in its closed position. Means are provided for releasably retaining the bed in its open position and, in the form shown, comprise elongated bed brace 34 pivotally mounted adjacent one extremity upon an edge of bed 32 and at its other extremity slidingly upon a portion of the camera body in known manner.

Figures 1, 3:
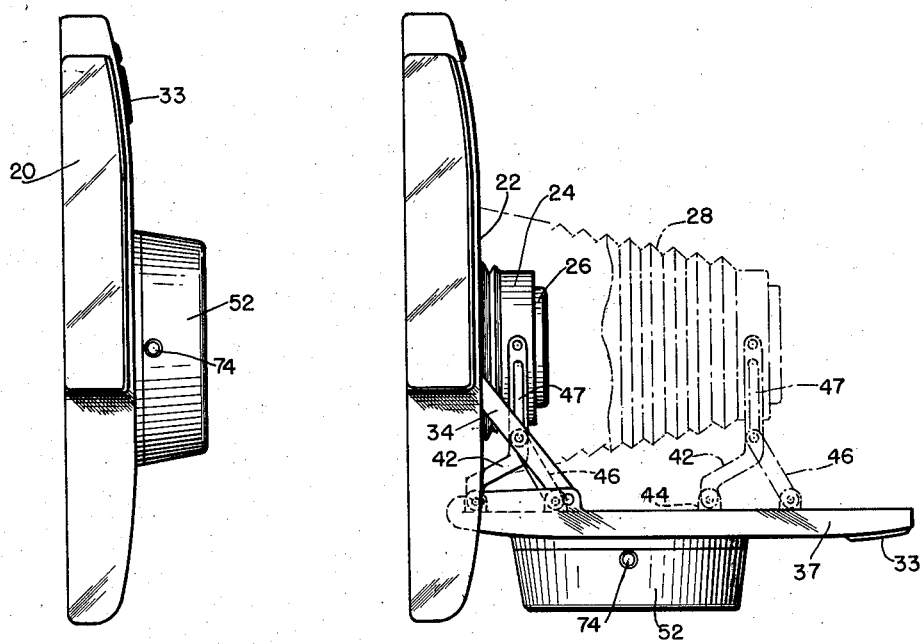
FIGURE 1 is a side elevational view, partly schematic, showing a camera embodying the principles of the present invention, the camera bed being open and the lens and shutter assembly being shown in solid lines in a closed position and in broken lines in a position of extension.
FIG. 3 is a side elevational view of the embodiment of FIG. 1 showing the bed closed against the camera body.
Figure 2:
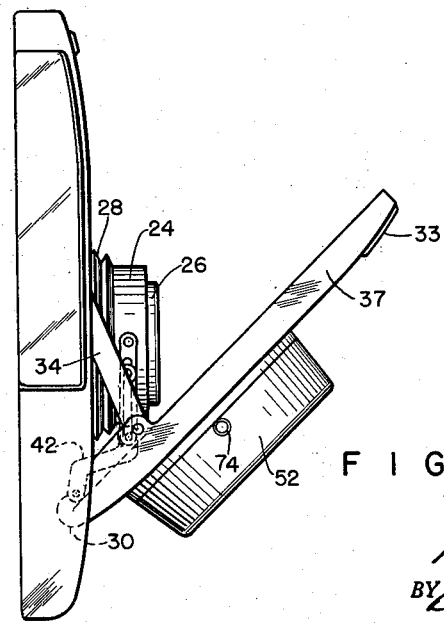
FIG. 2 is a side elevational view of the embodiment of FIG. 1 showing the camera bed at an intermediate position.
Figure 4:
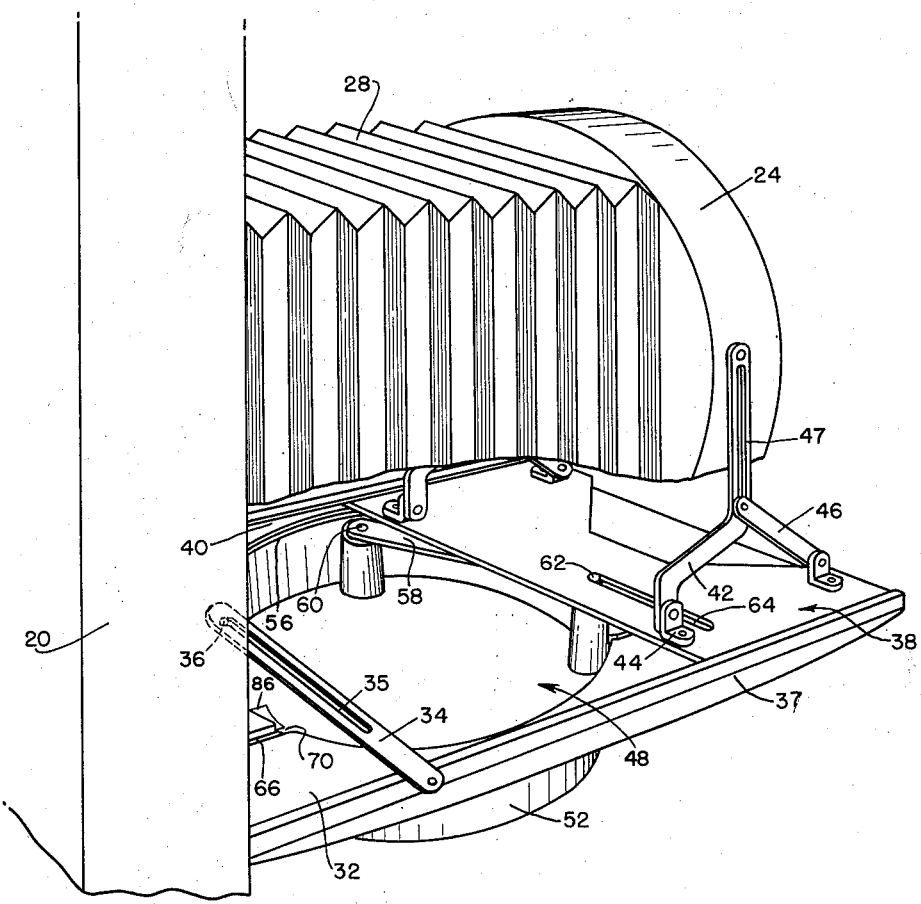
FIG. 4 is a perspective view, partly in fragment, showing selected elements of the device of FIG. 1 when the camera is in fully extended position.

As shown particularly in FIG. 4, the bed is provided at two opposite edges thereof with a pair of slotted, low, marginal walls or tracks 37, the tracks being so located as to extend outwardly and substantially perpendicularly to the axis of rotation of the bed about pivot 30, and are substantially parallel to one another. The erecting system includes a movable element or assembly carrier 38 which is shaped in the embodiment shown as a flat, substantially slab-like member having a pair of opposite edges slidingly engaged in slots 40 of the tracks. The movability of the carrier is therefore constrained to a path along the tracks and substantially parallel with the inner surface of the bed between limits defined approximately by the bed's pivoted and far edges.

The lens board, together with the lens and shutter assembly, is mounted upon the carrier by a pair of mounting devices (only one shown) connected to respective opposite side edges of the lens board. Each mounting device comprises a lens board support member 42 which, in the form shown, is an elongated element rigidly attached at one end to the lens board and pivotally attached at its opposite end to a mounting means such as bracket 44, the latter in turn being rigidly connected to or forming a part of the carrier. When the bed is open, as a means for maintaining the lens board in a substantially erect position (so that the optical axis of the lens assembly is substantially perpendicular to the exposure plane of the camera) each mounting device also includes brace means such as elongated link 46. One extremity of the link is pivotally mounted upon the carrier, and the other extremity is slidably engaged for movement within guide means, such as slot 47, provided in support member 42. The support member, slot 47, and link 46 are so dimensioned and positioned that when the bed is in its open position, support member 42 and the surface of carrier 38 form the right angle of a triangle having link 46 as the hypotenuse. In this position, the sliding extremity of the link is located at the lower end of slot 47 and is held in engagement therewith by the weight of the bed so as to prevent either forward or backward rotation of the lens board and assembly about the pivotal axis provided at bracket 44. However, rotation of bed 32 toward its closed position causes the sliding extremity of the link to move along slot 47 to the opposite end of the latter, thereby allowing the entire lens board to remain in a substantially erect position while the bed is closed. While a comparatively simple mounting has been described herein, it is to be understood that other mounting means may be employed with equal results in securing the lens board to the carrier.

Figure 6:
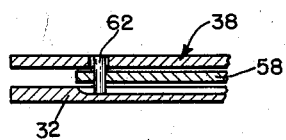
FIG. 6 is a cross-section taken along the line 6—6 of FIG. 5.
Figure 7:
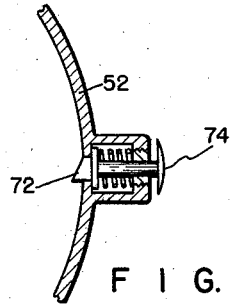
FIG. 7 is a cross-section taken along the line 7—7 of FIG. 5.

Referring now particularly to FIGS. 5, 6 and 7 there will be seen a diagram primarily of the carrier, camera bed, and means for moving the carrier in its path along the bed between the pivoted and far edges. The bed includes therein, intermediate its edges, a circular opening or hole 48. Hole 48 is so located and dimensioned that when the bed is in its closed position and the bellows, lens board and shutter, and lens assembly are, of course, fully retracted toward opening 22, any projecting portion of the lens and shutter assembly extends through hole 48 and outwardly of the bed. In most cameras, the lens and shutter assembly comprises a comparatively bulky unit. In order to accommodate this bulk, either the camera body is deepened or a hollow bed is provided. The present invention, however, allows the bed and camera body to be shaped for the accommodation only of the bellows and necessary photosensitive sheet materials, the latter being on spools or in packs, as the case may be.

Mounted for rotation within hole 48 by suitable mounting means, such as brackets 50, is a rotatable element or knob 52 which serves a dual function. In the embodiment shown, knob 52 is formed as a cylinder having a closed end, the cylindrical diameter being substantially greater than its axial dimension. The external diameter of the cylinder is only sufficiently smaller than the internal diameter of hole 48 to allow free rotation of knob 52 within hole 48, element 52 being retained for rotation in hole 48, in a plane approximately parallel to the planar surface of the bed, by tongues 54 on each bracket 50. Tongues 54 are disposed in sliding engagement with a cylindrical groove 56 provide about the interior wall of knob 52. The axial dimension of cylindrical knob 52 is predetermined in accordance with the extent to which the desired shutter and lens assembly protrudes through hole 48 when the bed is in a closed position, the end of element 52 then being located immediately adjacent, yet out of contact with, the most outwardly protruding portion of the shutter and lens assembly. It will therefore be seen that knob 52 provides a protective enclosure for the lens and shutter assembly of the camera when the latter is folded or closed. This aspect of the device forms the subject matter of copending application, U.S. Serial No. 59,933, filed October 3, 1960, by Richard J. Chen.

Additionally, knob 52 constitutes a portion of means for moving the carrier between its limits of motion and thus extending and retracting the lens and shutter assembly, as well as focusing the camera. For this purpose, the external periphery of knob 52 is provided with serrations or other surface discontinuities so as to be readily grasped for manual rotation by an operator of the device. The means for moving the carrier also includes a mechanism coupling knob 52 with carrier 38 for translating the rotational movement of knob 52 into linear movement of the carrier. Such a mechanism comprises an elongated element or link 58 having one extremity pivotally mounted, as at pivot 60, internally of knob 52 and adjacent the cylindrical wall thereof. The other extremity of link 58 is provided with a connecting means or pin 62. Pin 62 is provided as an elongated element which extends approximately perpendicularly of the axis of elongation of link 58 and to both sides thereof. One end of the pin is in slidable engagement with guide means, such as slot 64, provided in carrier 38. Slot 64 extends along the carrier from adjacent one edge of the carrier which is engaged with one of tracks 37 a predetermined distance across the carrier toward the opposite edge of the latter. The other end of the pin is in slidable engagement with an other guide means, such as channel 66, provided in bed 32 as at the surface thereof adjacent the carrier. Channel 66 extends from a point near the pivoted edge of the bed to and into hole 48, the direction of channel 66 being substantialy perpendicular to the direction of slot 64.

In the preferred embodiment, link 58 is resiliently biased for forcing pin 62 into channel 66 while yet allowing pin 62 to remain in sliding contact with the carrier at all times. Element 52 includes an engagement portion, such as well 68, located adjacent the internal periphery of element 52 at a position spaced from pivot 60 at a distance substantially equal to the distance between the latter and pin 62. The positioning of well 68 is such that it provides no obstruction to the movement of the carrier.

In operation, commencing with a fully closed camera, spring latch 33 is actuated to permit pivotal movement of the bed about pivot 30 and away from camera body 20 under the impetus provided, for instance, by a known type of spring loading or by manual operation.

Force exerted by an operator along the axis of knob 52 after actuation of the latch will, of course, provide the necessary impetus to move the bed to its open position wherein it is retained by brace 34. At the open position of the bed, (bellows 28 being still collapsed and lens board 24 and assembly 26 being closely adjacent opening 22) support member 42, link 46, and the bed form a support triangle which secure the lens board to carrier 38 in an exact position.

Figure 8:
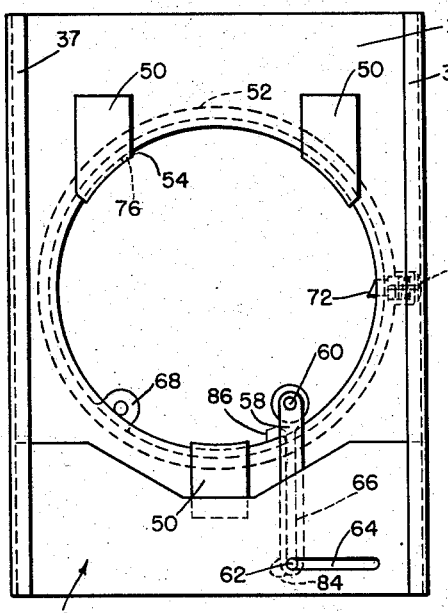

The operator now rotates knob 52 in a counterclockwise direction to effect extension of the camera elements from a base position (as shown in FIG. 8) wherein the knob and carrier are at maximum separation from one another and the carrier is at its fully retracted position adjacent the pivoted edge of the bed and to opening 22. This rotation of the knob moves link 58 away from the camera body, pulling carrier 38 together with the lens board along tracks 37 because of the engagement of pin 62 with slot 64. As carrier 38 progresses thus in an outward direction, link 58 is guided by the sliding engagement of pin 62 with channel 66, and slot 64 progresses (through the position as shown in FIG. 8) to a position above the cylindrical periphery of the knob. When slot 64 reaches this position (illustrated at FIG. 9), pin 62 passes through the mouth 70 at which channel 66 opens into hole 48, and well 68 has been rotated with knob 52 to a point immediately adjacent mouth 70. Consequently, pin 62, under the resilient bias amposed upon link 58, moves into and is releasably retained in fixed relation to the well, while yet remaining in sliding engagement with slot 64. Thus, the link is releasably retained in fixed relationship to the knob during part of the rotation of the knob. With continued rotation of knob 52, pin 62 rotates therewith and advances carrier 38 further toward the far edge of the bed.

Figure 10:
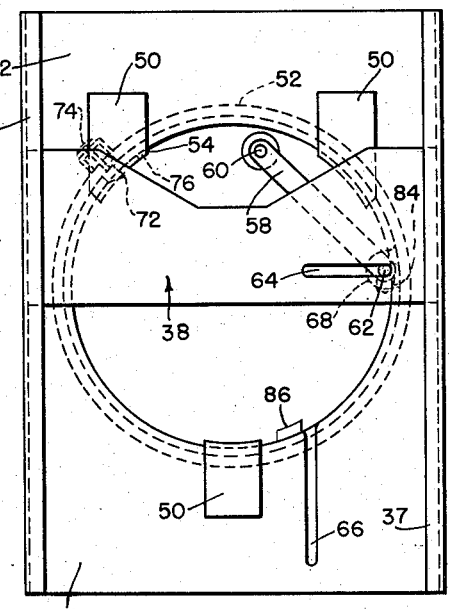
Figure 9:
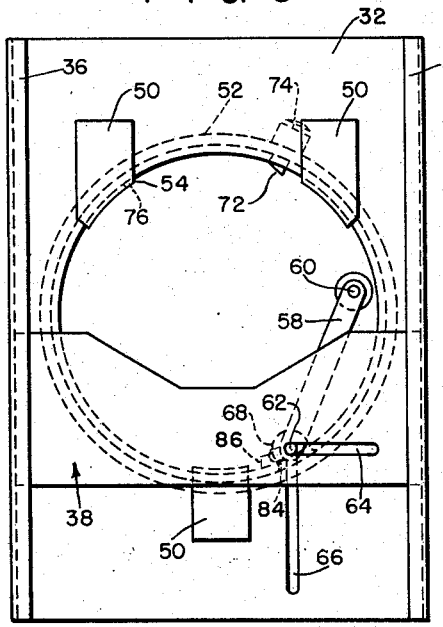

As the knob is rotated counterclockwise, it carries therewith a resiliently loaded stop means, such as pin 72 shown in detail in FIG. 7. Pin 72 is disposed on the cylindrical wall of knob 52 near the location of pin 60 and includes a manually engageable portion 74 which extends through the knob wall. As the carrier is advanced by rotation of the knob, pin 72 arrives at a position (as shown in FIG. 10) wherein it is engaged by a stop means such as tab 76 which extends into the path of movement of pin 72 at a fixed position, for instance, from one of brackets 50. Tab 76 is so shaped as to present a cam surface, thereby allowing pin 72 to ride over the tab by virtue of the spring loading of the pin. When the pin has passed tab 76, the latter acts as a limit stop preventing retrograde movement of the knob and other elements. Tab 76 and pin 72 are preferably so located with respect to the elements upon which they are mounted that at engagement of the pin and the tab the relation between the lens assembly carried on the carrier and the exposure plane of the camera body is that of "infinity" focus.

Figure 11:
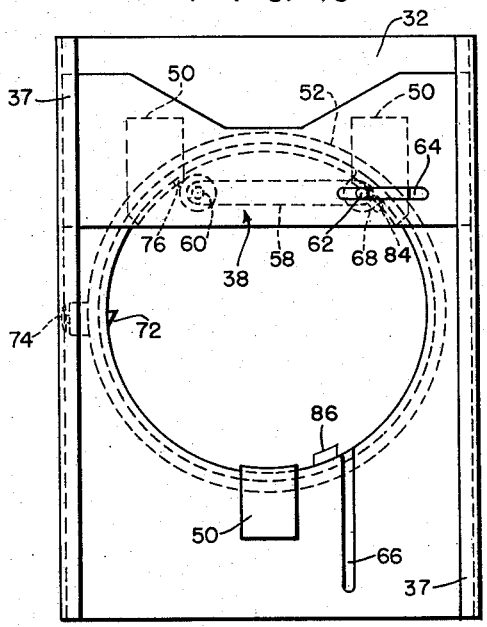

As rotation of the knob is continued further, pivot 60 arrives at a position (as shown in FIG. 11) wherein it is engaged by tab 76, thereby preventing any further counterclockwise rotation of the knob and subsequently ending the advance of the carrier. Pivot 60 and tab 76 are preferably so located that when in engagement with one another, the carrier has been advanced to a completely extended position wherein a "close-up" focus relation exists between the lens and the camera exposure plane. It will therefore be seen that the respective engagement of pin 72 and pivot 60 with tab 76 provide stop means which define the limit of focusing movement of the lens with respect to the camera body. In the preferred form, the two stop means or limit stops are located along a portion of the arcuate periphery of hole 48 which lies in a direction approximately, but not quite, transverse to the direction of movement of the carrier.

For the erecting system described, advancement of the carrier between its fully extended and fully retracted positions is effected by rotation of the knob through substantially 180°. Were the carrier movable only by a simple coupling between the periphery of the knob and the slot in the carrier, the motion of the carrier with respect to the rotation of the knob would be substantially sinusoidal; the linear motion of the carrier during about the first 45° of rotation of the knob would, for instance, be quite small, increasing to a substantially larger advance over the next 90° of rotation and then dropping to a substantially smaller advance with respect to about the last 45° of the rotation of the knob. In the present invention, the advance of the carrier from its fully retracted position with respect to the rotation of the knob is fairly large and is a substantially constant ratio over approximately the first 135° of rotation, becoming considerably and progressively lessened over the last 45°. Thus the arc of rotation of the knob between the limit stops preferably lies within the last 45° of and toward the terminal arc of rotation of the knob. Because the ratio of carrier movement to knob rotation is comparatively small within these limits, accurate control of focus is attained. On the other hand, during approximately the other 135° of rotation of the knob, the comparatively large ratio of carrier movement to knob rotation allows for simple, easy, and swift extension or retraction.

Of course, appropriate indicia and a corresponding fiducial mark may be placed respectively upon adjoining areas of the carrier and track, or vice versa, so that the camera is calibrated for proper focus. Additionally, knob 52 may be coupled in known manner with a telemeter device or range finder so that with rotation of the knob between the focus limit stops, the focus can be adjusted in accordance with the operator's observation of distance.

It should be noted that the movement of the carrier between its retracted position and completely extended position is over a distance which is substantially greater than the diameter of the knob, the latter being the maximum distance over which rotation of the knob could move the carrier if the latter were simply pivotally coupled to the knob periphery.

To close the camera, the operator pulls manually engageable portion 74 of pin 72, overcoming the resilient loading of the pin and moving the latter so that it readily clears tab 76 as knob 52 is rotated clockwise. During the return movement of the carrier effected by the clockwise rotation of the knob, the elements reach the position at which pin 62 is just outside of mouth 70 of channel 66. Further rotation of the knob moves finger 84, located at the unpivoted extremity of link 58, into engagement with cam means, such as upstanding portion 86, provided on bed 32 immediately adjacent one side of mouth 70. The clockwise movement of the knob then forces finger 84 to move up the cam surface of upstanding portion 86, lifting pin 62 out of well 68 and guiding the pin into channel 66.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a folding camera having a camera housing, a lens and shutter assembly, and a camera bed pivotally mounted at one of its edges upon said housing, a mechanism for reversibly extending said assembly along said bed, said mechanism comprising, in combination, support means upon which said assembly is mounted, said support means being mounted for linear movement upon said bed, an element mounted upon said bed for rotation through a predetermined arc, a link member having a pair of opposed extremities, one extremity being pivotally mounted upon said element at a position removed from the axis of rotation thereof, coupling means for slidably connecting the other extremity with a portion of said support means, and engaging means mounted on said element at a position arcuately spaced from the pivotal mounting of said one extremity, said other extremity being releasably engageable with said engaging means for retaining said link member in fixed relationship to said element through a portion of the arc of rotation thereof.

2. A mechanism as defined in claim 1 wherein said bed includes first guide means for controlling the movement of said other extremity during pivotal movement of said link member about said one extremity, resilient means for moving and retaining said other extremity in engagement with said engaging means during a portion of the rotation of said element in one direction, and cam means for moving said other extremity out of engagement with said engaging means and into said first guide means upon rotation of said element in an opposite direction.

3. A mechanism as defined in claim 1 wherein said bed includes first elongated guide means for controlling the movement of said other extremity during pivotal movement of said link member about said one extremity, said first guide means being elongated along the direction of linear movement of said support means, said coupling means comprising second elongated guide means having an axis of elongation in a direction substantially perpendicular to the direction of the linear movement of said support means.

4. In a photographic camera having a housing, a camera bed and a lens and shutter assembly mounted for reversible movement along said bed between protracted and retracted positions relative to said housing, a mechanism for imparting said movement to said assembly, said mechanism comprising, in combination, support means upon which said assembly is mounted, said support means being mounted for linear movement along said bed, a manually rotatable element mounted upon said bed for rotation through a predetermined arc, first coupling means movable with said rotatable element and connecting said rotatable element to said support means for transmitting motion from the former to the latter through a first portion of said predetermined arc, and second coupling means movable with said rotatable element and connecting said rotatable element to said support means for transmitting motion from the former to the latter through a second portion of said predetermined arc, the angle between the direction of movement of said first coupling means and said support means through said first portion of said arc being less than the angle between the direction of movement of said second coupling means and said support means through a terminal portion of said arc.

5. In a photographic camera having a housing, a camera bed, and a lens and shutter assembly mounted for linear movement along said bed, a mechanism for reversibly extending and focusing said assembly relative to an exposure plane within said housing, said mechanism comprising, in combination, support means mounted for linear movement along said bed, said assembly being movable with said support means from a first position adjacent said exposure plane, through an intermediate position at which said lens is at an infinity focus relative to said exposure plane, to a second position at which said lens is at a close-up focus position relative to said exposure plane, a rotatable element mounted on said bed for rotation through a predetermined arc, first coupling means between a first point on said rotatable element and said support means for transmitting motion from the former to the latter during movement of said rotatable element through a first portion of said arc, and second coupling means between a second point on said rotatable element and said support means for transmitting motion from the former to the latter during movement of said rotatable element through a second portion of said arc, said first and second points being spaced from the axis of rotation of said rotatable element and arcuately spaced from one another.

6. A mechanism as defined in claim 5 wherein the angle between the directions of movement of said second point and said support means is substantially reduced during a terminal portion of said arc.

7. A mechanism as defined in claim 6 including stop means which define the focusing limits of said assembly relative to said exposure plane, said stop means being operative when said support means reaches said second position and when said support means is moved from said second to said intermediate position.

References Cited in the file of this patent
UNITED STATES PATENTS
1,252,762    Young _____ Jan. 8, 1918